United States Patent [19]

McKee

[11] Patent Number: 4,561,055
[45] Date of Patent: Dec. 24, 1985

[54] TRANSMISSION CONTROLLER

[75] Inventor: Kevin D. McKee, Waterloo, Iowa

[73] Assignee: Deere & Company, Moline, Ill.

[21] Appl. No.: 446,915

[22] Filed: Dec. 6, 1982

[51] Int. Cl.⁴ .................... B60K 41/08; G06F 15/50
[52] U.S. Cl. ................................ 364/424.1; 74/866
[58] Field of Search ............... 364/424.1; 74/866, 861, 74/752 D

[56] References Cited

U.S. PATENT DOCUMENTS

| | | | |
|---|---|---|---|
| 3,448,640 | 6/1969 | Nelson | 74/866 |
| 3,628,642 | 12/1971 | Ravenel | 74/752 D X |
| 3,805,640 | 4/1974 | Schneider et al. | 74/866 X |
| 3,961,546 | 6/1976 | Gilmore et al. | 74/866 |
| 4,015,488 | 4/1977 | Akeson et al. | 74/866 |
| 4,208,925 | 6/1980 | Miller et al. | 74/866 |
| 4,338,832 | 7/1982 | Pelligrino | 74/866 |
| 4,345,490 | 8/1982 | Madson | 74/861 |
| 4,393,732 | 7/1983 | Suzuki et al. | 74/866 |
| 4,414,863 | 11/1983 | Heino | 74/866 |
| 4,463,628 | 8/1984 | Ahlschwede et al. | 74/861 |
| 4,476,530 | 10/1984 | Pannier et al. | 364/421.1 |

OTHER PUBLICATIONS

Gruben et al.: Electronics in a John Deere Scraper SAE Technical Paper Series #800875, Apr. 1980.

*Primary Examiner*—Felix D. Gruber

[57] ABSTRACT

A microprocessor-based transmission control system has both automatic and manual control modes and controls the transmission as a function of engine speed. The control algorithm automatically switches the control system to its manual control mode in response to certain conditions and failure modes.

13 Claims, 17 Drawing Figures

TRANSMISSION CONTROLLER

BACKGROUND OF THE INVENTION

This invention relates to a control system which controls a multi-ratio vehicle transmission.

It is known to automatically control the gear ratio of a vehicle transmission as a function of various sensed operating parameters. For example, it is known to automatically control a transmission to maintain the engine speed or transmission speed within narrow ranges. It is also known to provide a transmission control system with selectable manual and automatic control modes. However, such transmission control systems have not provided the capability of automatically switching from an automatic control mode to a purely manual control mode in response to various conditions, such as in response to a certain number of unsuccessful attempts to shift automatically, or such as in response to a single manual gear selecting operation. For example, the transmission control system disclosed in U.S. Pat. No. 3,628,642 has both manual and automatic control modes. However, with this control system, the manual control mode is limited by the electronic control unit with respect to an engine overspeed condition. Similarly, with the transmission control system described in U.S. Pat. No. 4,208,925, forced downshifting is delayed by the controller until vehicle ground speed is below a downshift speed point. Therefore, these control systems interfere with an operator attempting an emergency or forced downshift for the purpose of braking with the engine, and thus the manual control capability provided thereby is less than total.

SUMMARY OF THE INVENTION

An object of the present invention is to provide a vehicle transmission control system with both automatic and manual control modes.

Another object of this invention is to provide a transmission control system which automatically switches from an automatic to a manual control mode in response to various conditions.

Another object of this invention is to provide such a dual mode transmission control system with a manual control mode which is independent of non-manual inputs.

These and other objects are achieved by the present invention which consists of a computer-implemented transmission control system with an engine speed dependent control algorithm for automatic transmission control. The control algorithm automatically switches the system to a manual control mode in response to certain conditions and failure modes and in response to the application of a manual input.

DETAILED DESCRIPTION

Figure 1:
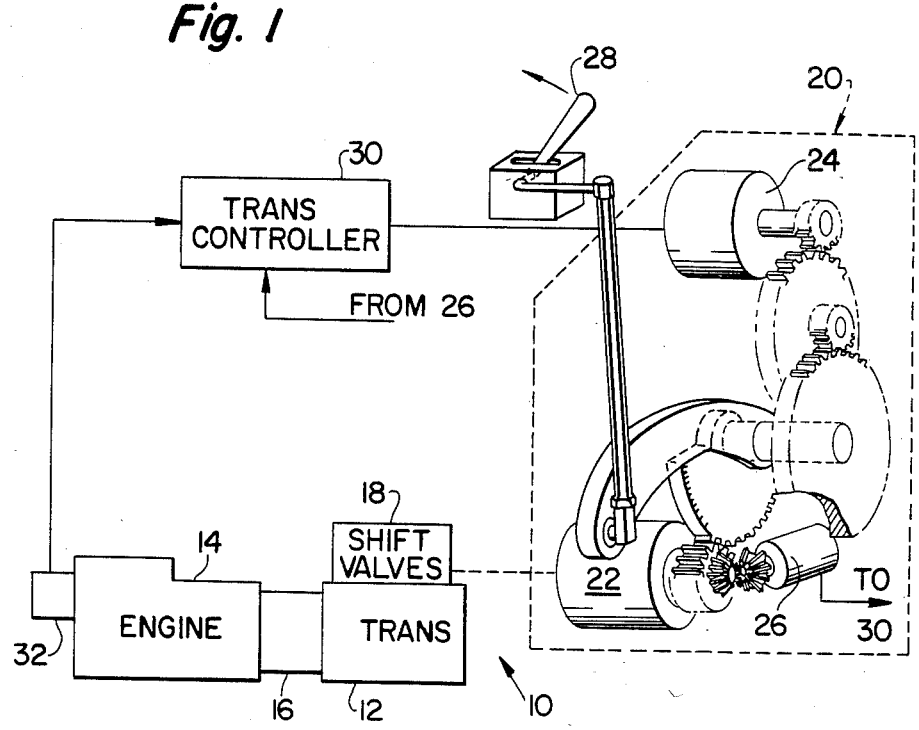
FIG. 1 is a simplified schematic view showing the interface of the present invention.

The vehicle transmission system 10 of FIG. 1 includes a hydraulically-operated multi-ratio transmission 12, such as described in U.S. patent application Ser. No. 134,274, filed Mar. 26, 1980, now U.S. Pat. No. 4,345,490. An engine 14 drives the transmission 12 via a conventional clutch 16. Shifting of the transmission 12 is accomplished by shift valves 18 which are controlled by an interface mechanism 20 which includes a rotary valve 22, a conventional 4-phase stepper motor 24 and a 4-bit gear encoder 26, all coupled together by a gear linkage which is linked to an operator-movable gear shift lever 28. The interface 20 is described in detail in U.S. patent application, Ser. No. 364,288, filed Apr. 1, 1982 now U.S. Pat. No. 4,463,628 which is incorporated by reference herein.

The stepper motor 24 is driven by a transmission controller 30 which receives input signals from the gear encoder 26 and from a magnetic pick-up 32 which generates an engine speed signal by sensing the motion of the teeth of the timing gear (not shown) of the engine 14.

Figure 2:
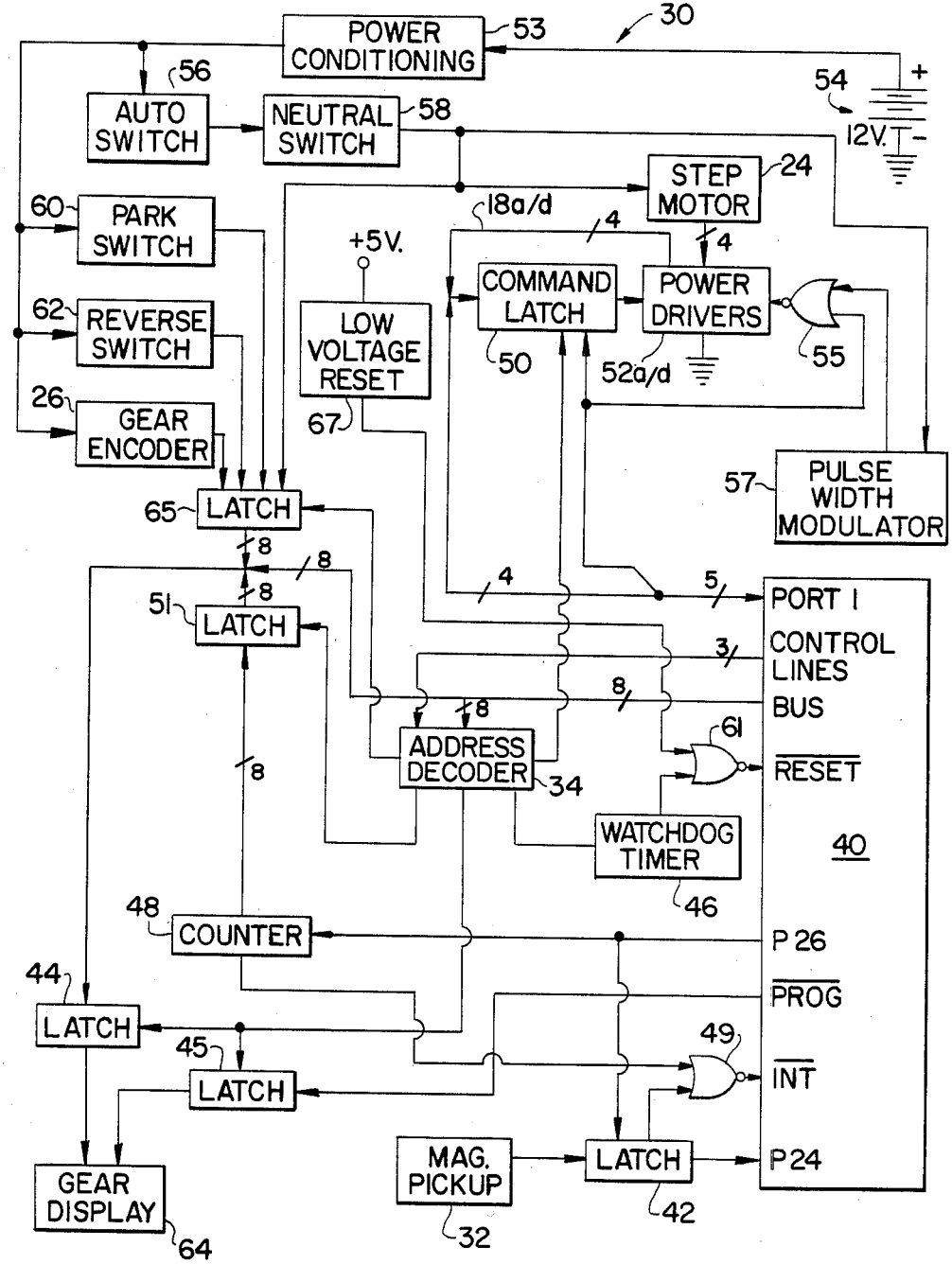
FIG. 2 is a simplified block diagram of the hardware of the present invention.

The major electrical components of the present invention are shown in the block diagram of FIG. 2. The controller 30 includes a conventional microprocessor 40, such as an Intel 8048. The micro 40, as is well known, includes various registers, counters, timers and input and output ports, etc. The micro 40 also includes a read only memory (ROM) which contains a specific routine as described hereinafter. An engine speed related pulse train signal is provided to micro input P24 from mag pickup 32 via latch 42.

A "watch dog" timer 46 is coupled to the $\overline{\text{RESET}}$ input of the micro 40 via NOR gate 61 and is coupled to address decoder 34. Address decoder 34 is also coupled to the micro BUS and control lines, to command latch 50, and to latches 44, 45, 51 and 65. An 8-bit counter 48 is coupled to the 8-bit BUS via latch 51 and is coupled to NOR gate 49 and to micro port P26. The output of NOR gate 49 is coupled to an $\overline{\text{INT}}$ port of micro 40.

Voltage from battery 54 is conditioned by a power conditioner 53 which includes a reverse polarity diode (not shown) to protect the controller 30 from reverse battery connection and a transient suppressor to protect against voltage spikes of over 40 volts. The power conditioner 53 is coupled to a series connected auto/manual switch 56 and neutral switch 58 and to parallel connected park switch 60, reverse switch 62 and gear encoder 26. Thus, driving power is provided to stepper motor 24 via power conditioner 53 and switches 56 and 58. A set of four power drivers 52a–d provide current paths for the energizing currents for the four-phase stepper motor 24 in response to control signals communicated to the power drivers via the command latch 50. Micro input/output port 1 (5-bit) is coupled to command latch 50 and to power drivers 52a–d. Gear encoder 26 and switches 58, 60 and 62 are connected to BUS via latch 65. Latches 44, 45, 51 and 65 are preferably Motorola MC14013 latches.

Switches 56–62 are preferably mounted in a suitable position in the vehicle operator's compartment. Preferably, the auto/manual switch 56 is mounted on the shift lever quadrant cover (not shown). The neutral switch 58 is preferably mounted on the shift linkage in the shift lever quadrant (not shown) and will be opened when the shift lever 28 is in its neutral position. The reverse switch 62 is preferably mounted on the housing of the transmission rotary shift valve 20 and the park switch 60 is preferably mounted on the shift linkage in the shift lever quadrant. A gear display unit 64 preferably includes an LCD display and a serial-in/parallel-out register (not shown) which transfers data from latches 44 and 45 to the LCD display. The gear display unit forms no part of the present invention. Pulses applied to the INT port of micro 40 trigger an interrupt routine which will be described later with respect to FIGS. 9a and 9b.

Figure 3:
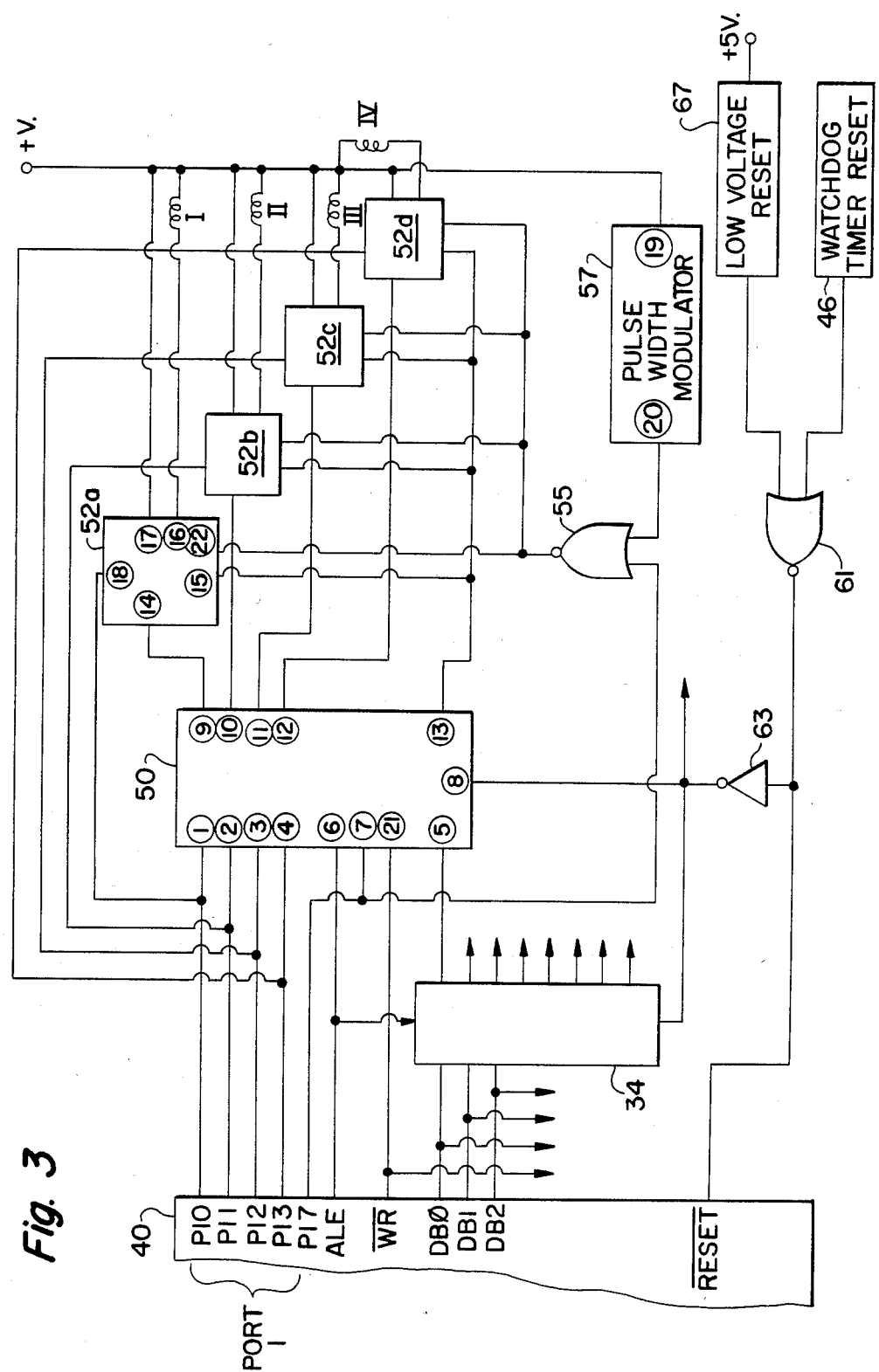
FIG. 3 is a more detailed schematic view of a portion of the present invention.

Referring now to FIG. 3, the microprocessor input/output ports, P10–P13 are coupled to the command latch 50 and to each of the four power drivers 52a–52d. The ALE output of micro 40 provides a 239 KHz clock signal to the command latch 50 and to a conventional address decoder 34 for system timing. Micro port P17 provides signals for initiating a "command latch window" and provides a pulse width modulation inhibit signal to NOR gate 55.

The command latch 50 is coupled to each of the power drivers 52a–52d. Each power driver is coupled to the battery voltage, +V, and to the four phases, I–IV, of the stepper motor 24. The battery voltage is also coupled to a pulse width modulator 57 which generates a pulse width modulated signal with a duty cycle inversely proportional to the magnitude of +V so as to maintain constant average current to the stepper motor phase coils despite variations in the battery voltage +V. The output of pulse width modulator 57 is communicated to each of the power drivers 52a–52d via NOR gate 55 only when the signal from micro port P17 is low.

Nor gate 61 and inverter 63 provide signals to the command latch 50 and to the RESET terminal of micro 40 so that power driver outputs 9–12 of the command latch 50 are low to turn off power drivers 52a–52d whenever a 5-volt regulator supplied voltage is low or whenever the watchdog timer 46 times out. The low voltage reset circuit 67 includes an 8212 voltage detector (not shown) coupled to a set-reset flip-flop (not shown) so that the flip-flop holds the micro in reset when the regulated voltage is low and for a predetermined time after it returns to its normal level.

Figure 4:
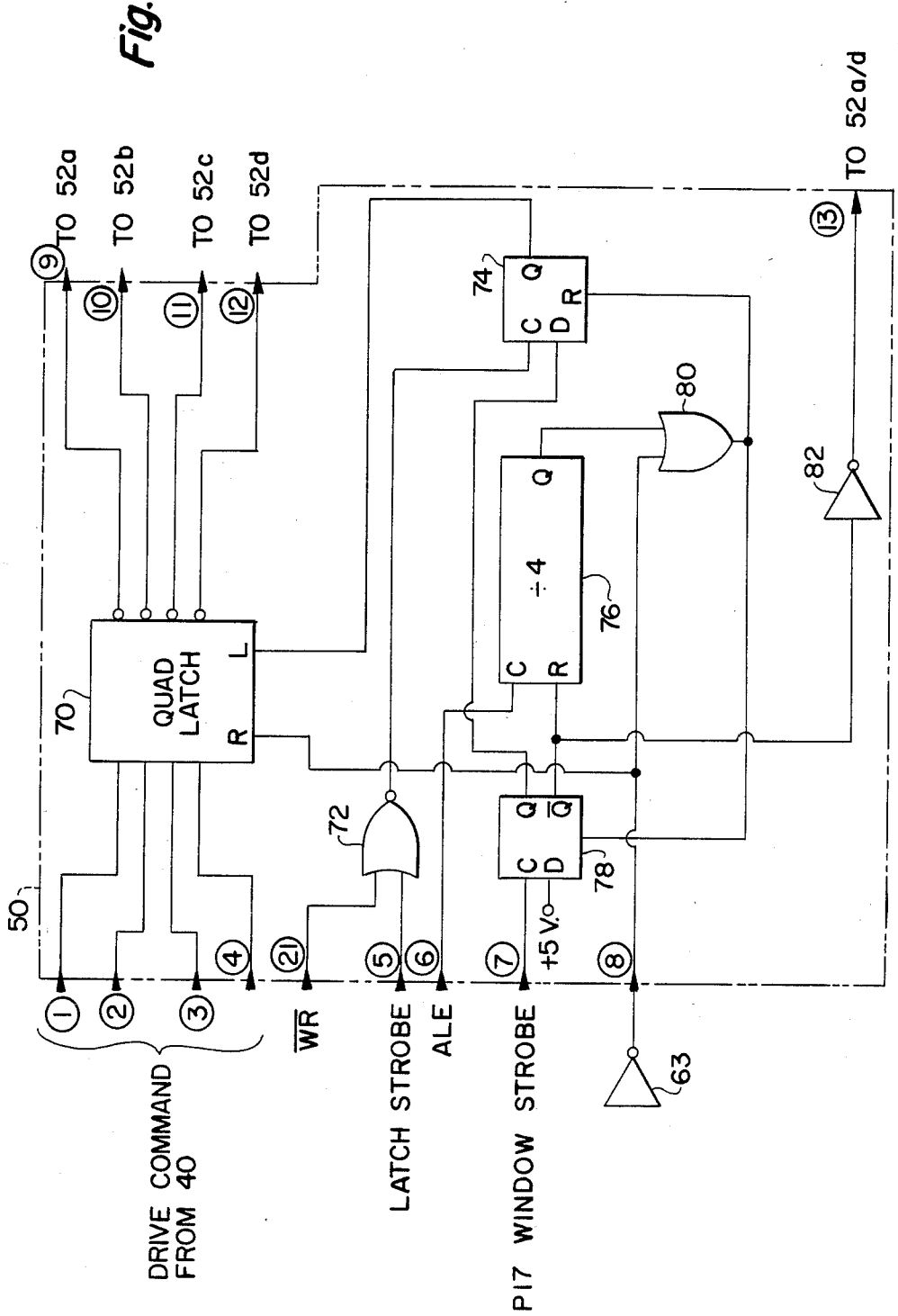
FIG. 4 is a circuit schematic of the command latch used in the present invention.

Turning now to FIG. 4, the command latch 50 includes a Motorola MC14018 connected as a quad latch 70 which receives the stepper motor drive commands from the micro input/output port P10–P13. The outputs of quad latch 70 are coupled to respective inputs of the power drivers 52a–52d. A NOR gate 72 couples the $\overline{WR}$ micro signal and a "latch command" signal from address decoder 34 to the clock, C, input of "D-latch" 74, which is preferably one-half of a Motorola MC14013. The ALE micro output is coupled to the clock input of a divide-by-four counter 76, preferably a Motorola MC14024. The P17 micro output is coupled to the clock input of another "D-latch" 78 also preferably one-half of a Motorola MC14013. Command latch 50 also includes an OR gate 80 coupled to inverter 63, quad latch 70, counter 76 and D-latches 74 and 78, as shown. Finally, command latch 50 includes an inverter 82 which provides a "fly-back sense inhibit" signal from the $\overline{Q}$ output of D-latch 78.

The command latch 50 operates as follows: Assume that stepper motor drive commands are present at the P10–P13 micro input/outputs. Next, the micro 40 will send a "window command" pulse to D-latch 78 which toggles the Q output of D-latch 78 and the D-input of D-latch 74 high, thus opening a "window". Then when a "latch strobe" pulse is applied to NOR gate 72, the Q output of D-latch 74 and the L input of quad latch 70 toggle high, and quad latch 70 transfers the stepper motor drive command to the respective power drivers 52a–52d.

Figure 5:
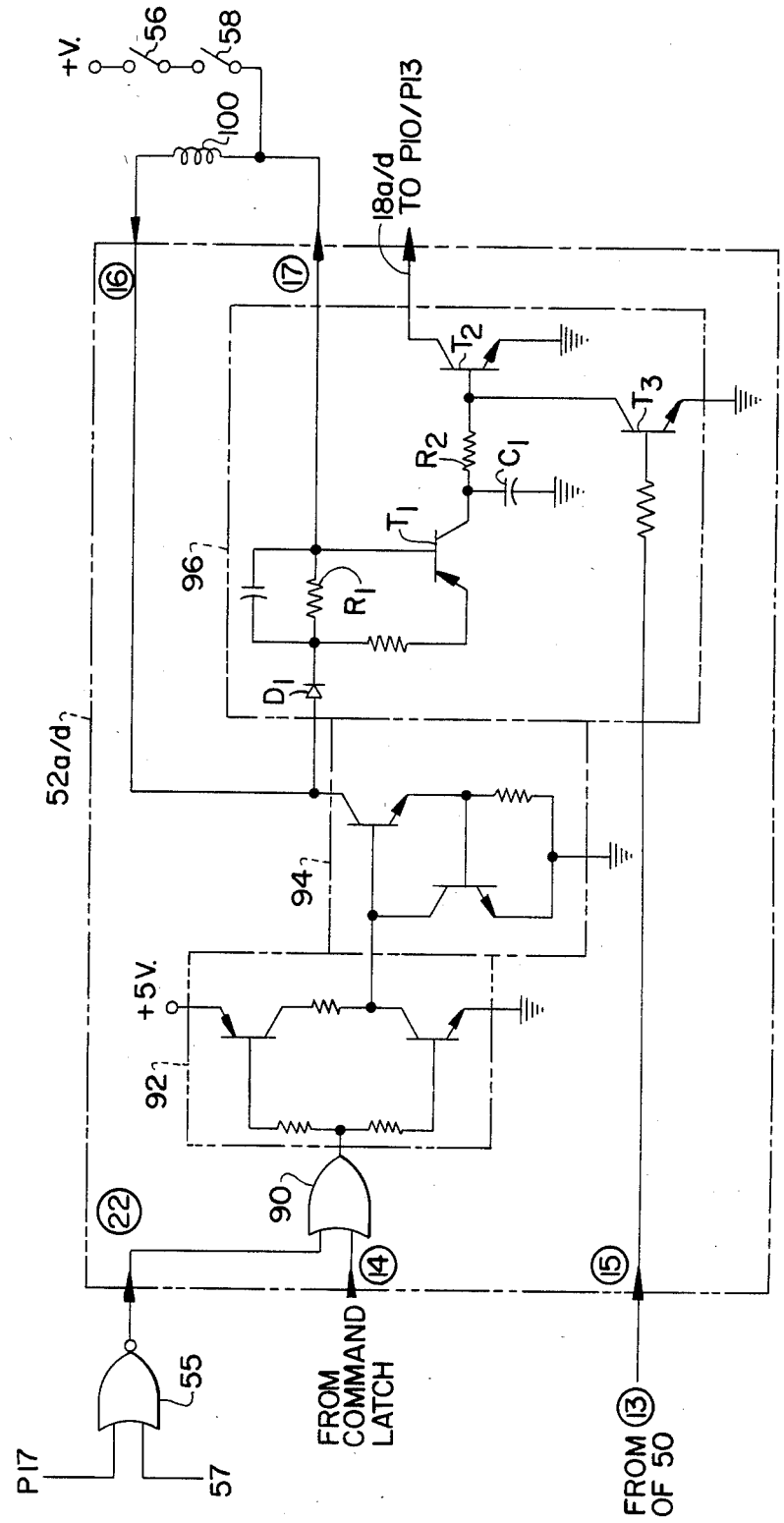
FIG. 5 is a circuit schematic of the power driver used in the present invention.
Figure 6A:
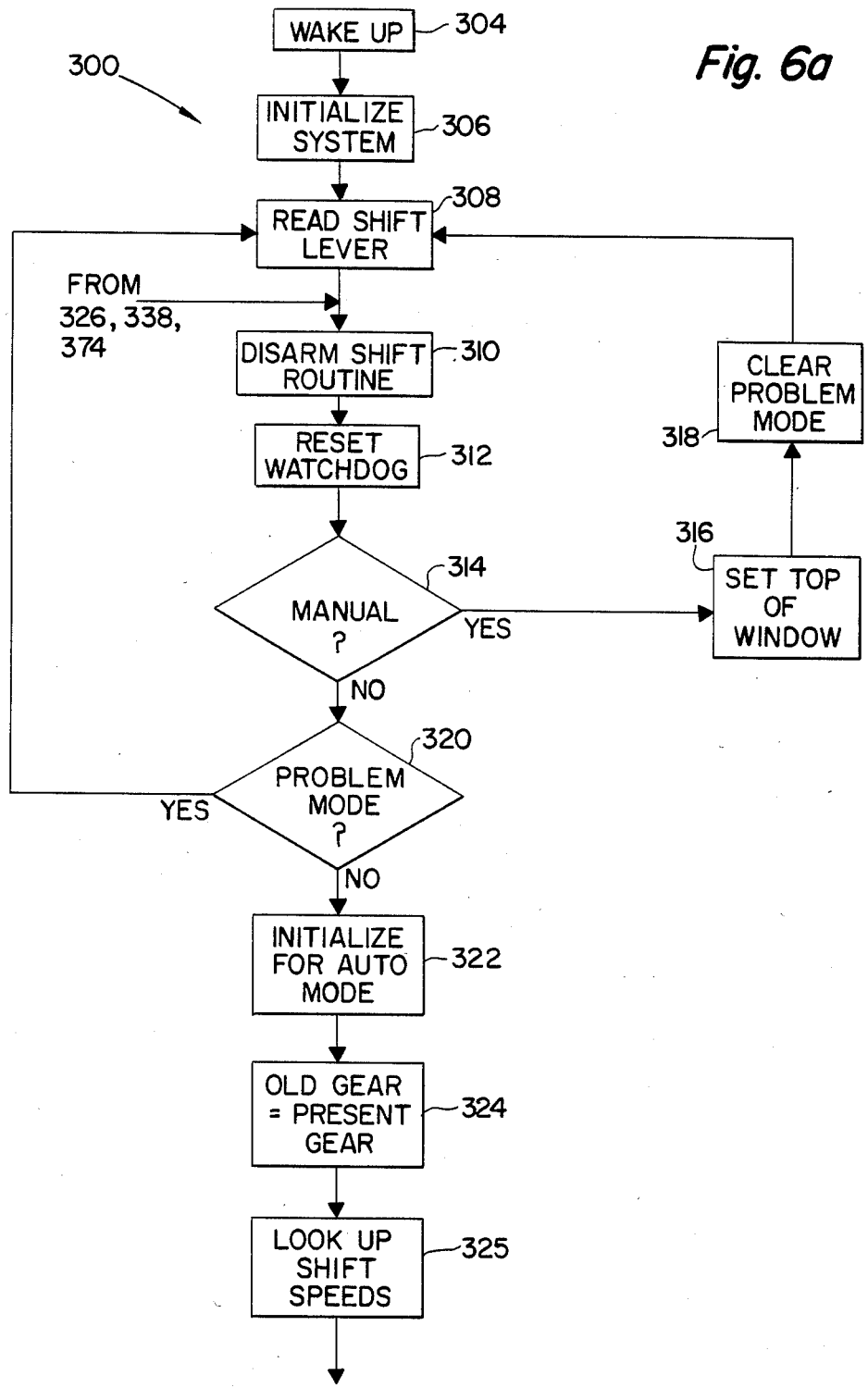
FIGS. 6a–e are flow charts of the main control algorithm used in the present invention.
Figure 6B:
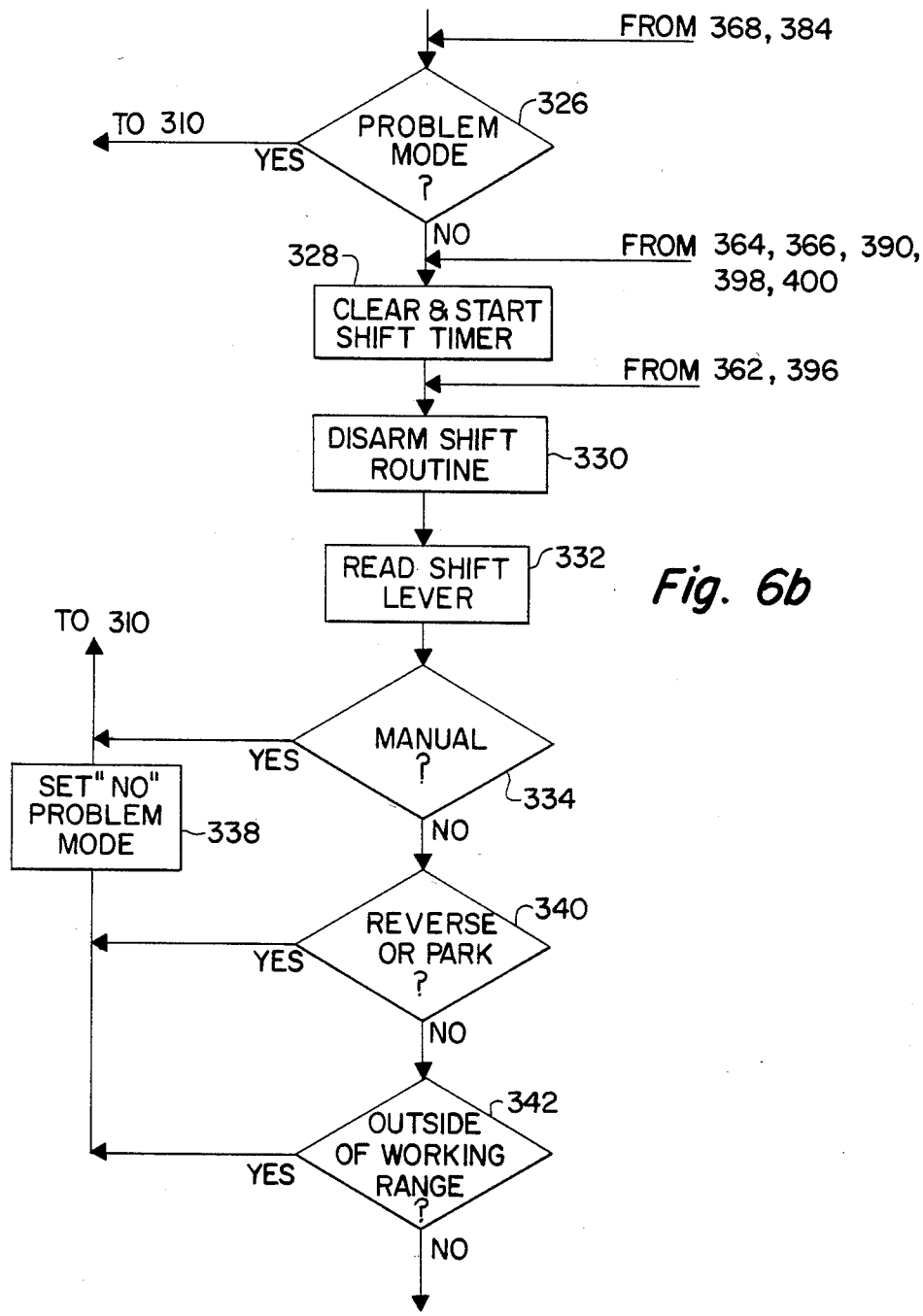
Figure 6C:
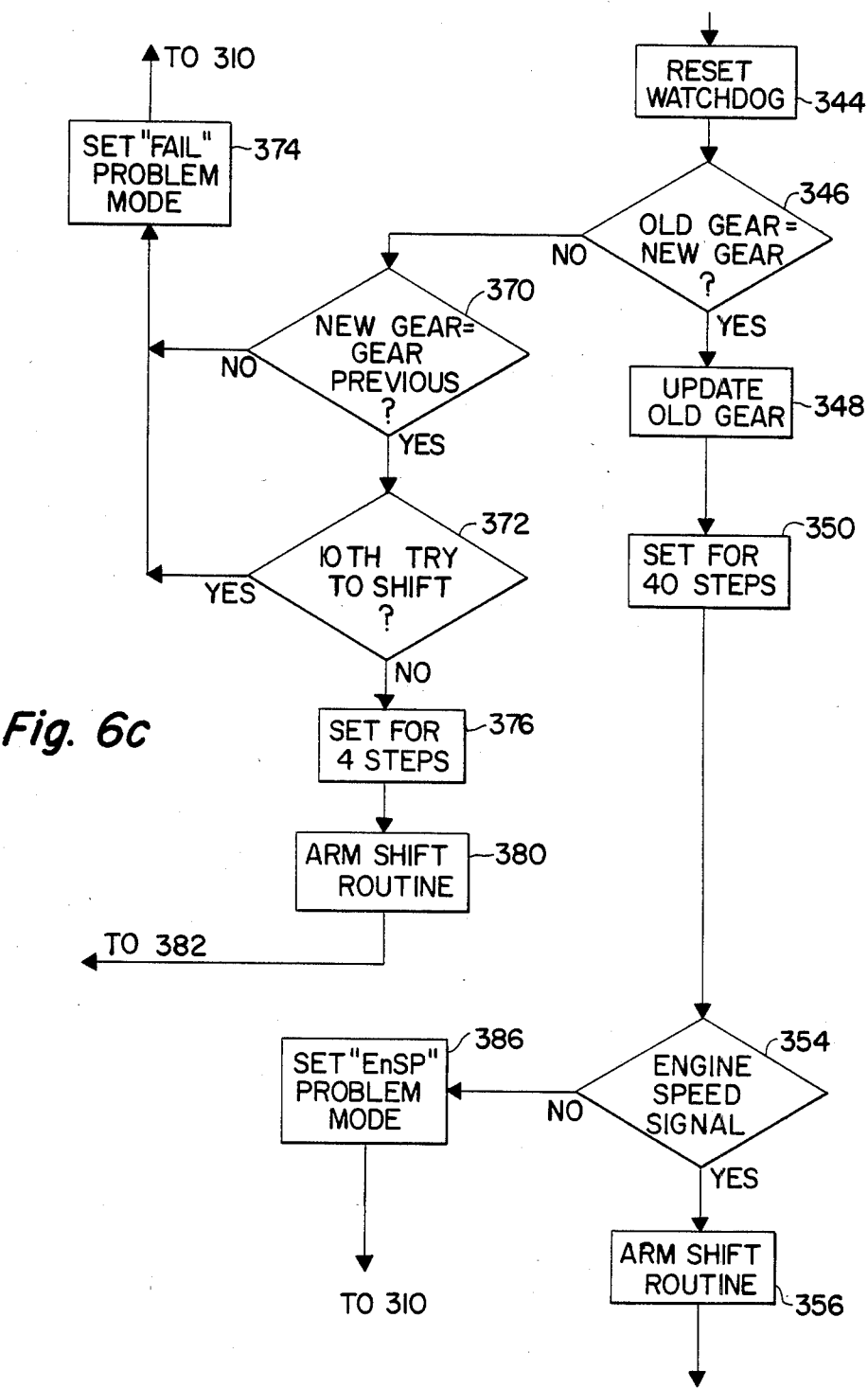
Figure 6D:
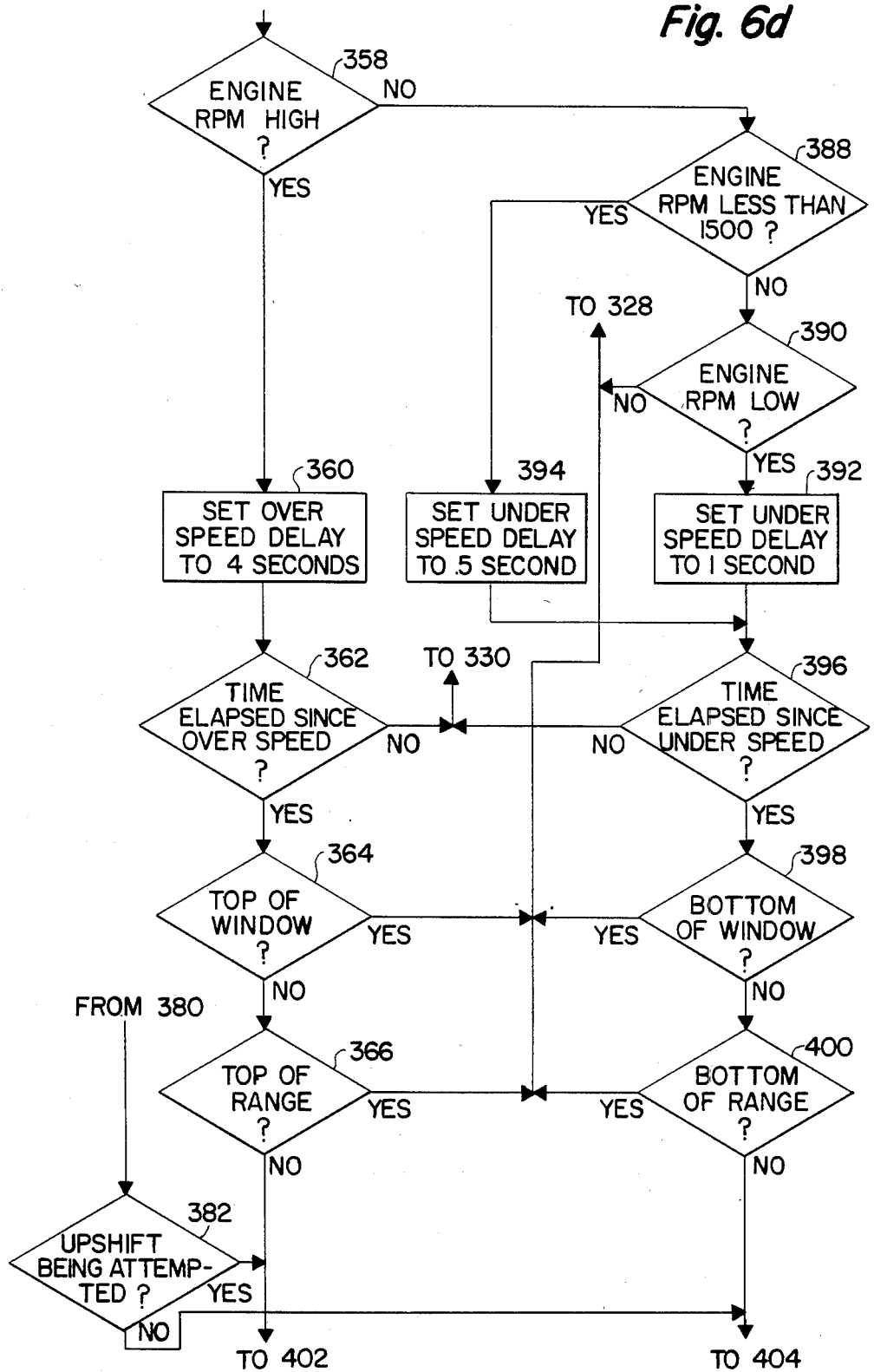
Figure 6E:
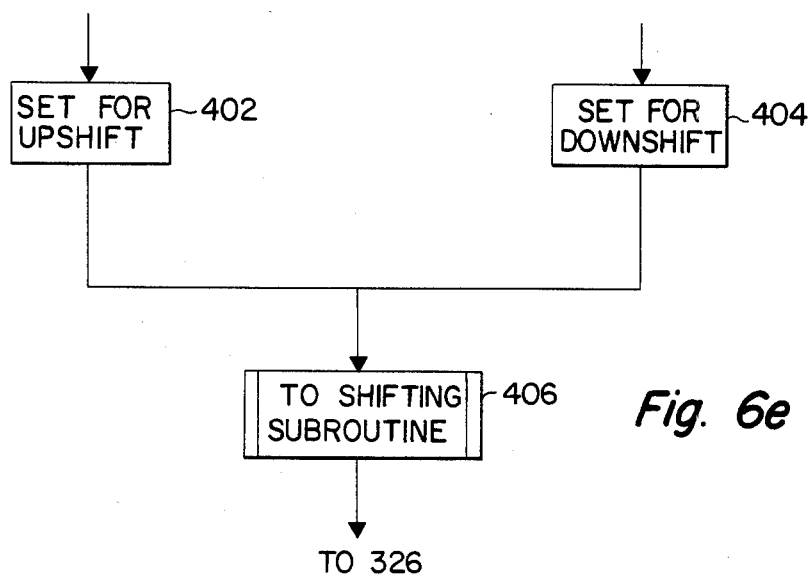

Referring now to FIG. 5, each of power drivers 52a–d includes an OR gate 90 with inputs coupled to the output of NOR gate 55 and to a corresponding one of driver outputs 9–12 of the command latch 50. The output of OR gate 90 is coupled to a conventional push-pull driver amplifier 92. The output of push-pull amplifier 92 is coupled to a conventional Darlington power driver 94 with current limit. The output of driver 94 is coupled to a corresponding one of the stepper motor coils I–IV or phases, as indicated by 100. Each power driver 52a–d also includes a "fly-back" sense circuit 96 which pulls micro input/outputs P10–P13 to ground whenever the stepper motor phases are being driven.

In operation, the stepper motor phase 100 is driven in a continuous manner or in a pulsed manner due to the pulse width modulated signal transmitted to OR gate 90 via NOR gate 55. When Darlington driver 94 turns off, then inductive fly-back current flows through diode D1 and resistor R1, thus turning on transistor T1 and charging capacitor C1. The voltage across C1 turns on transistor T2, thus pulling micro input/outputs P10–P13 to ground. Capacitor C1 and resistor R2 assure that T2 is continuously turned on, rather than intermittantly turned on, whenever the motor phases 100 are being pulsed. The grounded condition of input/outputs P10–P13 indicate to the micro 40 that the stepper motor phases have been properly energized. After the motor phases have been energized, a fly-back sense inhibit pulse turns on transistor T3 which turns off transistor T2. This terminates the fly-back sensing and permits new stepper motor drive command signals to appear at micro input/outputs P10–P13.

The transmission controller 30 controls the transmission 12, according to a main control algorithm, and subroutines executed by the microprocessor 40, and which are illustrated by the flow charts in FIGS. 6a–6e, 7, 8a–8c, and 9a and b.

Figure 7:
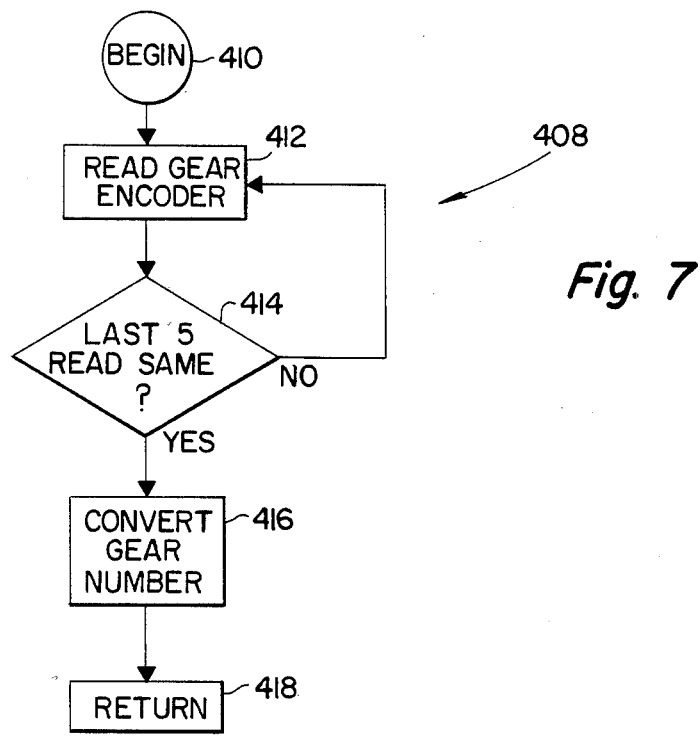
FIGS. 7, 8a–c and 9a–b are flow charts of subroutines used in the present invention.

The main algorithm 300 begins at step 304, after which in step 306, all counters are zeroed and registers are initialized. Then, a "read shift lever" subroutine 408, described in detailed later with respect to FIG. 7, is entered via step 308. In this subroutine, the 8-bits of the BUS are examined and binary numbers representing the status of switches 56–62 and the position of gear shift lever 28 are obtained. Then, in step 310, a "non-valid" number is placed in an "arm register" (not shown) so that operation of shifting algorithm 500 is prevented unless steps 380 or 356 place valid numbers in the "arm registers" under certain specified conditions, which will be described later. In step 312, the watchdog timer 46 is reset. Thus, if the loop or algorithm operates properly, the timer 46 will always be reset before it times out. Step 314 directs the algorithm to step 316 if the auto/manual switch 56 is in its manual position, else, the algorithm proceeds to step 320.

In step 316, the present gear of the transmission 12, as indicated by the encoder 26, is set as the top gear of a four-gear "window" above which the controller is not allowed to shift the transmission 12. Then, in step 318, a "problem mode" register, to be explained later, is cleared. The algorithm then returns to previously described step 308. This portion of the algorithm comprises the algorithm steps which are operational when the transmission 12 is under manual control due to the setting of switch 56 in its manual position which disconnects the stepper motor 24 from the battery 12.

However, if the operator closes the auto/manual switch 56, thus completing a circuit between battery 54 and the stepper motor 24, then the algorithm proceeds from 314 to step 320 which will route the algorithm back to step 308 and prevent automatic shifting if any problem mode values are present in the problem mode register due to the operation of later described steps 338, 374, 386 or 532.

Steps 308–320, together with steps 370 and 374 (described later), cause this control system to operate as follows: Assume that the control system is in its automatic control mode due to the auto/manual switch 56 being in its auto position. Now, assume that the operator causes the shift lever 28 to move. This movement will be detected and a "problem mode" will be set by steps 370 and 374 and the routine enters the "manual loop" at step 310. The routine will remain in this "manual loop" as long as the auto/manual switch 56 is not changed due to steps 374 and 320. To return to automatic operation, the operator must switch the auto/manual switch 56 to its manual position so that step 314 routes the routine to step 318 to clear the problem mode which was set by step 374. Then, once the auto/manual switch 56 is returned to its auto position, steps 314 and 320 will permit the routine to exit from the manual loop and return to automatic operation. This permits the operator to perform an emergency downshift to utilize engine braking merely by moving the shift lever without interference by the automatic operation of the controller. It also prevents the control system from returning to its automatic mode unless the operator consciously toggles the auto/manual switch 56.

In step 322, a timer/counter (not shown) is enabled to count clock pulses so that the time intervals between shifts can be measured. Next, in step 324, an "old gear" value is set equal to the present gear. Then, in step 325, the present gear is determined and upshift and downshift engine speed values are established for that gear as follows:

For all gears, including neutral, but with the exception of the 8th gear, the upshift speed is 2206 rpm, while the downshift speed is 1896 rpm. For the 8th gear, the upshift speed is 2206 rpm while the downshift speed is 1857 rpm. These values are only exemplary and it should be understood that other engine speed values could also suffice.

Next, step 326 directs the algorithm to step 310 if any problem mode values are present in the problem mode register, else, the algorithm proceeds to step 328, where a shift timer is cleared and started so that the time interval between successive shifts can be determined. Then, in step 330, a non-valid value is once again placed in the "arm register", just as in step 310 previously described. Then, the read shift lever subroutine is entered via step 332, and the position of the shift lever 28 is once again determined from the gear encoder 26.

Step 334 then directs the algorithm to step 310 if the operator has requested manual operation via auto/manual switch 56, otherwise, the algorithm proceeds to step 340. If the reverse or park switches 62 and 60 are closed, then step 340 directs the algorithm to step 338 where the problem mode register is set to a value which will prevent automatic operation due to step 326, after which the algorithm returns to step 310 for manual operation. Otherwise, the algorithm proceeds to step 342, which also directs the algorithm to steps 338 and 310 if the transmission is outside of a "working range" which is preferably defined as gears 4–10, else the algorithm proceeds to step 344, where the watchdog timer is reset, as in previously described step 312. This working range prevents the transmission from shifting to too high a gear when in automatic.

If, in step 346, the "old gear" is the same as the "new gear", which would be the case if the shift lever 28 has not been moved or if the previous shift was properly completed and the signal from gear encoder 26 has changed accordingly, then the algorithm proceeds to step 348. Otherwise, the algorithm proceeds to step 370, to be described later. In step 348, the current gear value is assigned to the "old gear" register. Then, in step 350, the shift routine is set for 40 steps per command, 40 stepper motor steps being the number of steps required to produce a 1-gear change by the stepper motor 24.

Then, a validity check is performed by step 354 whereby the algorithm is directed to step 356 if a proper signal is being produced by the engine speed mag pickup 32, and whereby, if no proper engine speed signal is generated, the algorithm is directed to step 386 where a "problem mode" value is generated and then back to earlier described step 310. This validity check may be performed by examining the count in an "overflow" register (not shown) which counts the number of times which engine speed counter 48 overflows. In step 356, an "arming code" or "password" is placed in the "arm" register so that a shifting subroutine may be executed, as will be described later.

Step 358 compares the engine rpm, as sensed by sensor 32, to the upshift speed for the current gear, as set in the look-up table examined in previous step 325. If the engine rpm is not higher than the upshift speed established in step 325, then the algorithm is directed to step 388, otherwise, the algorithm proceeds to step 360 where an overspeed delay requirement of 4 seconds, for example, is established. Step 362 then routes the algorithm back to step 330 and thus, prevents an upshift, unless this 4 second delay period has expired. Thus, no upshift is allowed unless the overspeed condition persists for at least 4 seconds. Steps 364 and 366 prevent upshifts by returning the algorithm to step 328 if the current gear is the same as the top gear of the "window" established in step 316 or if the current gear is outside of the previously described "working range" of gears 4–10, for example. If neither of these conditions is satisfied, then the algorithm proceeds to step 402, where the shift direction is set for an upshift. After step 402, a shifting subroutine is entered via step 406. After the shifting subroutine is executed, the algorithm returns to step 326. The shifting subroutine will be described later in detail with reference to FIGS. 58a–58c. In short, the shifting subroutine generates commands which, via command latch 50 and power drivers 52, rotate stepper motor 24 and pilot valve 22 to cause shift valves 18 to shift the transmission 12 to the next appropriate gear.

Now, returning to step 346, if the "old gear" was not the same as the "new gear", then the algorithm proceeds to step 370. Step 370 directs the algorithm to step 372 if the "new gear" is the same as the gear which the transmission was in previous to the most recent shift, in which case, it can be assumed that a shift has been attempted, but not successfully completed. Otherwise, step 370 directs the algorithm to step 374 in which case, it can be assumed that the gear shift lever 28 has been moved by the operator. In the case where a shift has been attempted, but not completed, then step 372 directs the algorithm to step 376 unless this is the 10th attempt to shift to the "new gear", whereupon the algorithm is directed to step 374. Step 374 generates a "fail" problem mode value and returns the algorithm to step 310. Thus, steps 370–374 return the algorithm to step 310 for manual control if the gear shift lever 28 has been moved by the operator, if the gear encoder 26 has failed, or if a shift has been unsuccessfully attempted ten times consecutively.

Step 376 sets the shift routine to 4 stepper motor steps per command so that 40 steps will be commanded by 10 trips through this portion of the algorithm. Then, in step 380, an "arming code" or "password" is placed in the "arm" register so that the shifting algorithm 500 may be executed, as will be described later. Then, step 382 directs the algorithm to the upshift direction setting step 402 or the downwshift direction setting step 404 and then to the shifting algorithm via step 406 so that the appropriate up or down shift is attempted again.

Returning now to step 358, if step 358 has directed the algorithm to step 388 on account of the engine rpm not being higher than the appropriate upshift speed set forth in the look-up table, then the engine rpm is compared to 1500 rpm in step 388. If the engine speed is less than 1500 rpm, as would be the case if the engine were stalling, then the algorithm proceeds to step 394 where an underspeed delay requirement is set to, 0.5 seconds, after which the algorithm proceeds to step 396. If the engine speed is not less than 1500 rpm, then the algorithm proceeds from step 388 to step 390 where it is compared to the appropriate downshift speed established in the look-up table. If the engine speed is not lower than the downshift speed, then no shift is required and the algorithm returns to step 328. However, if the engine speed is lower than the downshift speed, then the algorithm proceeds to step 392 where an underspeed delay requirement is set to 1.0 seconds, after which the algorithm proceeds to step 396.

Step 396 directs the algorithm back to step 330 if the delay requirement established in step 392 or 394 has not elapsed. Otherwise, the algorithm proceeds to step 398. Step 398 directs the algorithm back to step 328 if the present or current gear is the same as the bottom gear (three (3) gears below the top gear) of the "window" established in step 316. Otherwise, the algorithm proceeds to step 400. Step 400 also directs the algorithm to step 328 if the current gear is the same as the bottom gear of the previously described "working range" of gears. Otherwise, the algorithm proceeds to step 404 where the shifting direction is set for a downshift. From step 404, as from step 402, the shifting subroutine is entered via step 406 after which the algorithm returns to step 326.

The read shift lever subroutine 408 which is entered via steps 308 and 332 of the main algorithm 300 will now be described with reference to FIG. 7. This subroutine 408 is entered at step 410, after which, in step 412, the 8 bits from the BUS port of computer 40 are read. This includes the 4-bit gray code signals which represent the status of gear encoder 26. Then, step 414 directs the subroutine back to step 412 unless there has been no change in the last five readings from gear encoder 26. In step 416, the gray code number representing the position of gear encoder 26 is converted to a binary number. Step 418 returns the subroutine to the main algorithm 300 for execution of steps 310 or 334. In this manner, the status of gear encoder 26 is re-examined prior to every manual or automatic shift and each time the main algorithm 300 is executed.

Figure 8A:
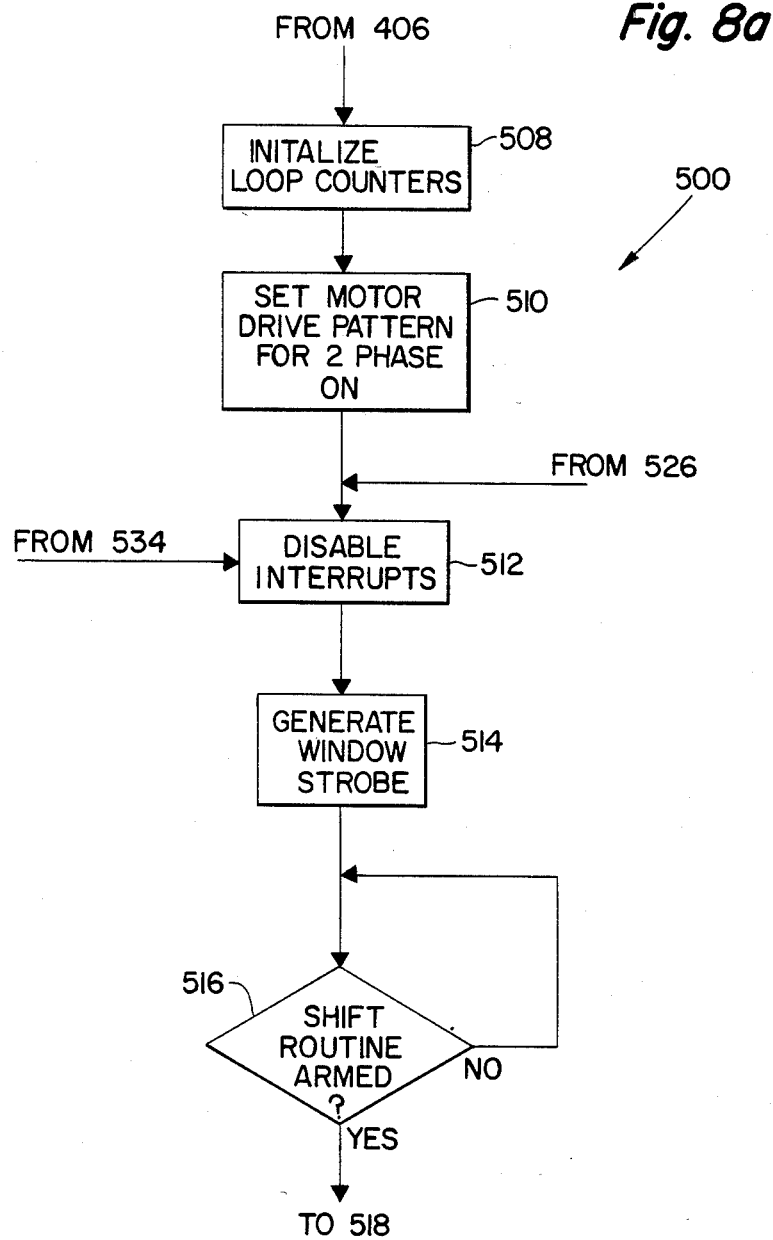
Figure 8B:
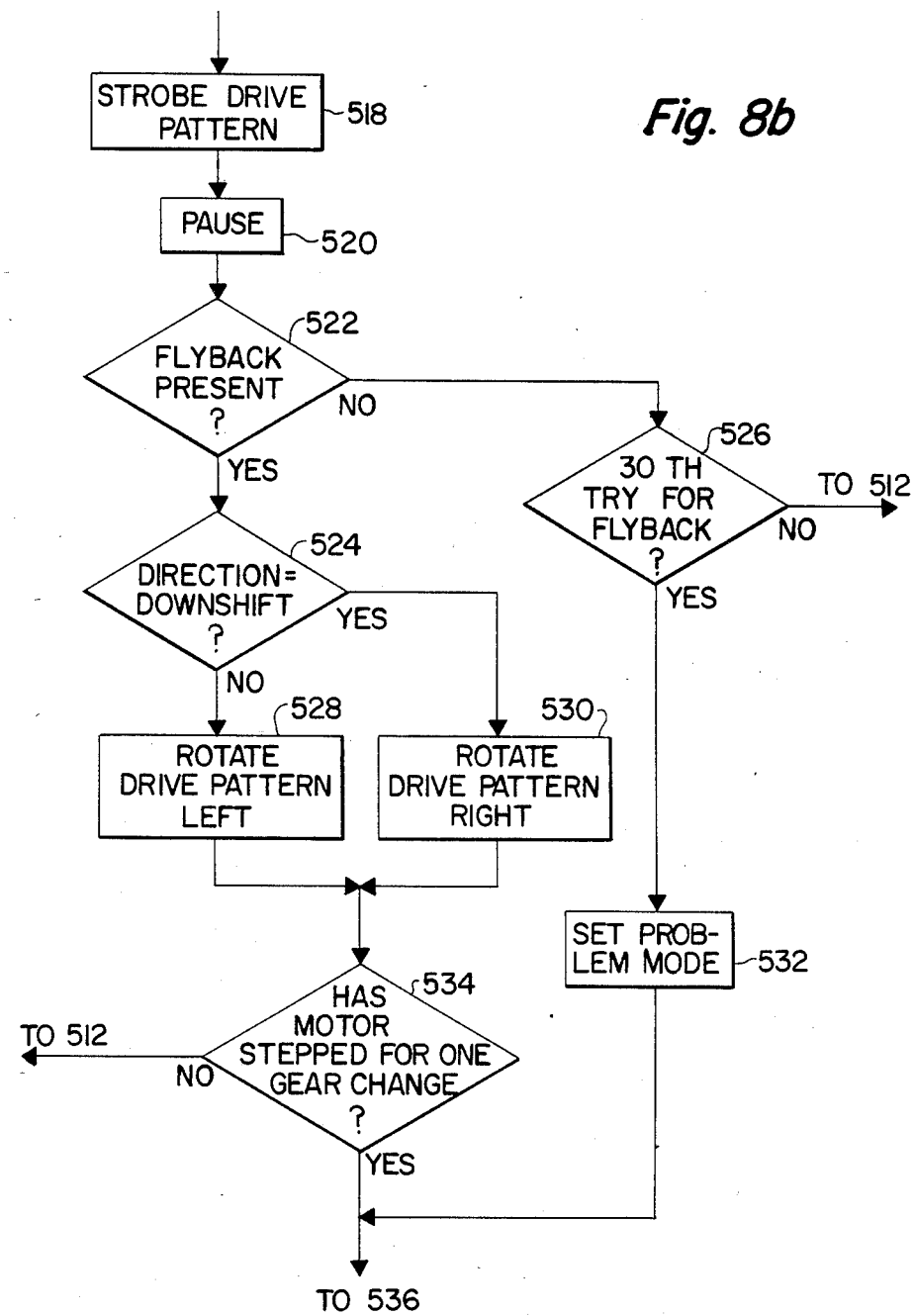
Figure 8C:
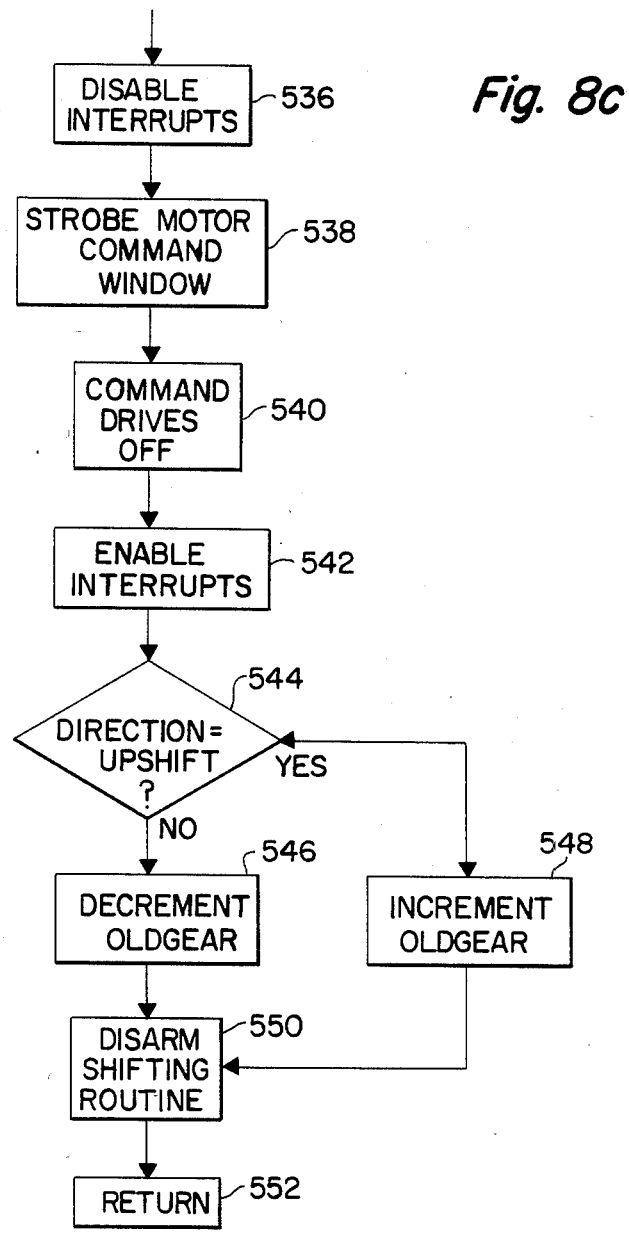

The shifting subroutine 500, which is entered via step 406 of the main algorithm 300, will now be described with reference to FIGS. 8a–8c. First, step 508 initializes a "fly-back" counter so that the controller can count the number of times consecutively which a particular one of the stepper motor drivers is energized without an indication from the fly-back sensing circuit 96 that it has been turned on. Also, a "loop" counter is loaded with a value representing the number of stepper motor steps established by either step 350 or 372 of the main algorithm 300.

Next, in step 510, a register is initialized to an appropriate value so that the stepper motor 24 will be energized in a conventional 2-phase-on manner. Also, an "ignore" mask register is set up so that the controller will ignore fly-back signals from the most recently energized stepper motor drivers.

Next, in step 512, interrupts are disabled to prevent undesired interruptions of the shifting subroutine by the interrupt routine, as described later herein.

Figure 10:
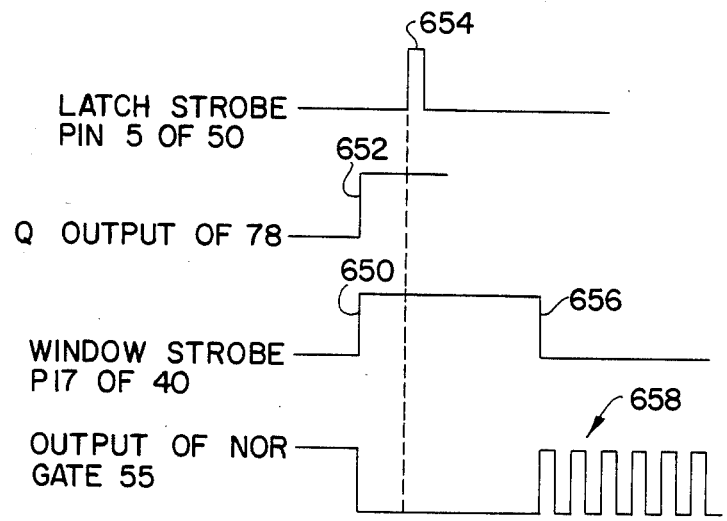
FIG. 10 is a signal timing diagram of selected signals which occur in the operation of the present invention.

Then, at step 514, the window strobe signal, which appears at P17 of micro 40 and which is applied to pin 7 of latch command 50, toggles to a logic 1 value, as at 650 of the waveform diagram of FIG. 10. This causes the Q output of D-latch 78 to toggle high, at 652, thus opening a "window" of time during which signals may be passed through quad latch 70 to the power drivers 52a–d.

Step 516 inquires whether or not the shift routine has been "armed" or "disarmed" by steps 310, 330, 356 or 380, of the main loop. If not armed, then step 516 repetitively loops back, and eventually, watchdog timer 46 times out and the algorithm is hardware shifted to the beginning of main loop 300.

If armed, then the routine proceeds to step 518 whereupon a "latch strobe" pulse is generated, as at 654 of FIG. 10, and applied to the latch strobe input pin 5 of command latch 50. This causes quad latch 70 of command latch 50 to receive and transfer the drive command signals from micro ports P10–13 to the stepper motor drivers 52a–d. During this time, the window strobe signal remains at "logic 1" so that the selected ones of drivers 52a–d will be on in a constant, unmodulated manner in order to supply sufficient driving current to shift the stepper motor 24.

After 518, a pause subroutine is entered at step 520. The pause subroutine causes the window strobe to return to a "logic 0" level at 656 of FIG. 10, which may be a particular time, (for example 3.18 miliseconds) after generation of the latch strobe signal. When the window strobe signal returns low, the output of NOR gate 55 is thereafter modulated, as at 658 of FIG. 10, by pulse width modulator 57. Thus, the current which drives stepper motor 24 is modulated to reduce power consumption. The pause subroutine pauses another 2.4 miliseconds and then returns to step 522 whereupon the signal on fly-back sense line 18 of power driver 52a–d (FIG. 5) is examined. If fly-back is present, then transistor T2 will be on and a logic 0 will appear at the fly-back sense line. If no fly-back is present, then this is an indication that a failure has occurred, such as an open or short circuit condition of the stepper motor, the wiring harness or the power drivers. An error condition is also indicated when the drivers are off, but fly-back is present. In this case, the routine proceeds to step 526, which returns the routine to step 512, unless it is the 30th time fly-back is looked for in step 522. Otherwise, the routine proceeds to step 532 which sets a "problem mode" indication, and then to 536.

If a fly-back error is not present, then the routine proceeds from step 522 to steps 524–530 which rotate the stepper motor drive patterns, depending upon whether an upshift or a downshift is to be made. Then, step 534 directs the routine back to step 512 if the stepper motor 24 has not been stepped enough (4 or 40 times) to complete a gear change. Otherwise, the routine proceeds to step 536 where the interrupts are again disabled, as in previously described step 512.

In steps 538–540, the procedure of steps 514 and 518 is repeated, but with drive commands on micro output ports P10–P13 such that all drivers 52*a–d* are turned off. Then, in step 542, the interrupts are enabled.

In steps 544–548, the "old gear" value is decremented or incremented, depending upon whether the shifting direction is for a downshift or for an upshift. Then, the shifting routine is disarmed in step 550 and step 552 causes a return to the main algorithm 300.

Figure 9A:
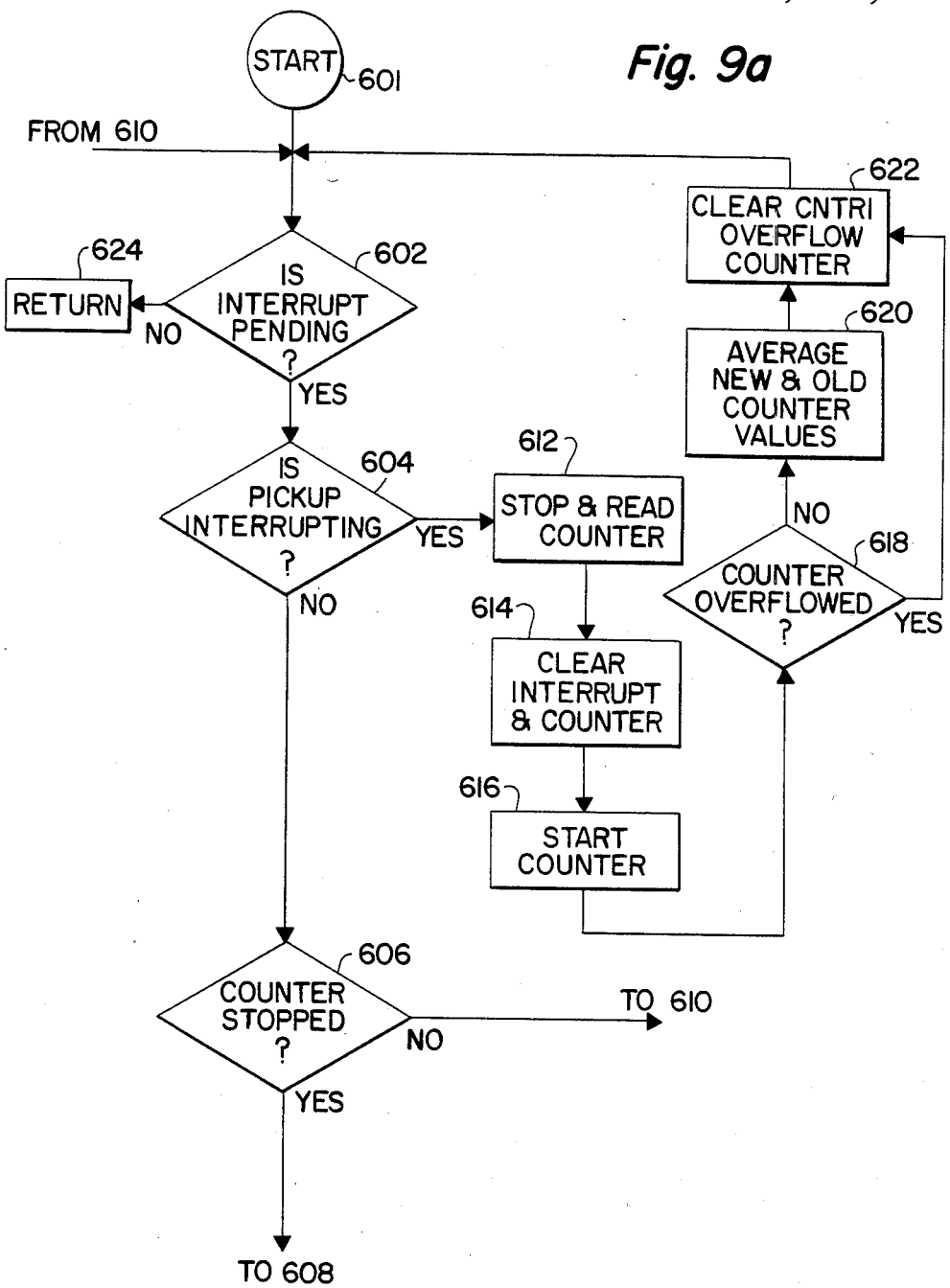
Figure 9B:
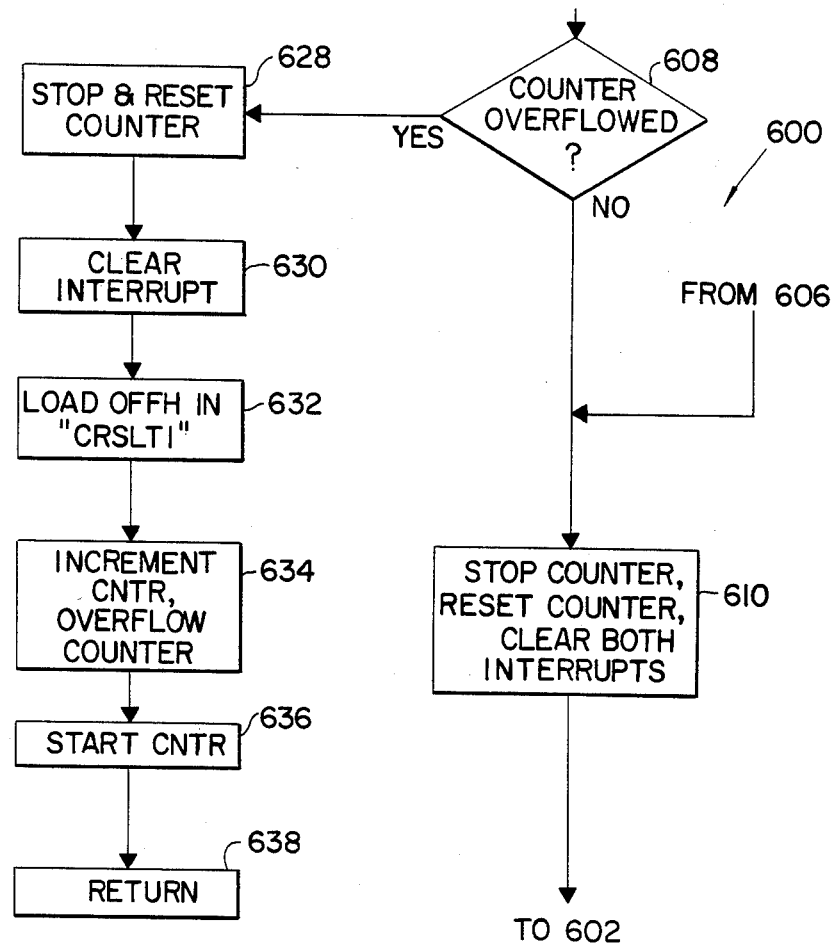

The main algorithm shown in FIGS. 6*a–6e* is interrupted, and an interrupt routine 600, shown in FIGS. 9*a–9b*, is performed whenever an interrupt signal is applied to the interrupt port, INT, of the micro 40. Thus, the interrupt routine 600 will be entered at step 601 whenever a pulse from the engine speed mag pickup 32 or whenever an overflow pulse from counter 48 is received by NOR gate 49. Then, step 602 directs the algorithm to step 604 unless all interrupts have been cleared, whereupon step 624 causes a return to the main loop at the point at which the interrupt occurred.

If the interrupt was due to a pulse from the engine speed mag pickup 32, then 604 directs the algorithm to steps 612–616 where the counter 48 is stopped and read, the interrupt register and the counter 48 are cleared and counter 48 is re-started. If counter 48 overflows, then step 618 routes the algorithm to step 622. If counter 48 has not overflowed, then a new counter value is calculated as a weighted average of the new and old counter values, with a weighting ratio of 1 to 7 (new to old). Then, in step 622, the register which counts overflows of counter 48 is cleared and the algorithm returns to step 602.

If the mag pickup 32 was not the source of the interrupt, then 604 directs the algorithm to step 606. Step 606 directs the algorithm to step 610 if the counter 48 has not stopped, else the algorithm proceeds to 608 where an overflow condition of counter 48 is checked. If counter 48 has not overflowed, then in step 610, the counter 48 is stopped and reset and both interrupts are cleared, and the routine returns to step 602. If counter 48 has overflowed, then 608 directs the algorithm to steps 628–638. In 628, the counter 48 is stopped and reset. In 630, the interrupt is cleared and then in 632, a value is placed in a "CRSLT1" register to indicate to the main loop that an overflow has occurred. Then, in 634, the overflow counter is incremented so that its contents represents the number of overflows of counter 48. In 636, counter 48 is started and then step 638 causes a return to the main loop.

Thus, the interrupt routine 600 operates with counter 48 to monitor the engine speed from mag pick-up 32 and to keep track of overflows of counter 48, too many of which indicate that a failure condition exists.

The conversion of the above-described flow chart into a standard language for implementing the algorithm described by the flow chart in a digital data processor, such as a microprocessor, will be evident to those with ordinary skill in the art. Thus, the various elements set forth in the appended claims are achieved by the apparatus and structure described herein together with this specific algorithm also described herein.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A vehicle transmission control system comprising:
   an engine-driven transmission for transmitting torque at selected gear ratios;
   manual input means for manually generating shift control signals;
   shift means for shifting the transmission among its gear ratios in response to manually and automatically generated shift control signals;
   operator-actuatable mode selecting means for selectively placing the control system in an automatic control mode and in a manual control mode; and
   a control unit coupled to the shift means and to the mode selecting means for automatically generating shift control signals as a function of sensed vehicle and transmission operating parameters when the control system is in its automatic control mode, the control unit including mode switching means for automatically switching the control system from its automatic to its manual control mode in response to selected conditions without actuation of the mode selecting means.

2. The transmission control system of claim 1, wherein the mode switching means comprises:
   shift error sensing means for detecting if the shift means successfully shifts the transmission in response to the shift control signals, means for generating an error signal in response to a predetermined number of failures of the shift means to shift the transmission in response to the shift control signal, and means for preventing automatic generation of further shift control signals after the occurrance of said predetermined numbers of failures so that the transmission may only be shifted manually thereafter.

3. The transmission control system of claim 2, wherein the shift error sensing means comprises:
   gear ratio sensing means for sensing the gear ratios of the transmission and for generating a gear ratio signal corresponding to the gear ratio of the transmission;
   means for generating a first gear ratio signal corresponding to the actual sensed gear ratio of the transmission prior to generation of a shift control signal by the control means;
   means for generating a second gear ratio signal corresponding to the actual sensed gear ratio signal of the transmission subsequent to generation of said shift control signal by the control means; and means for comparing the first and second gear ratio signals and for generating an error signal if the second gear ratio signals is the same as the first gear ratio signal after generation of the predetermined number of shift control signals.

4. The transmission control system of claim 2, further comprising:

means for sensing the speed of the engine, the control means further comprising means for comparing the sensed engine speed with predetermined upshift and downshift engine speed values and means for automatically generating shift control signals which cause the shift means to shift the transmission to maintain the engine speed within a predetermined range.

5. The control system of claim 1, comprising:

means for sensing the speed of the engine and for generating an engine speed signal, the control unit including means for automatically generating shift control signals as a function of the sensed engine speed and of transmission operating parameters; and the mode switching means comprising means for preventing automatic generation of shift control signals when no engine speed signal is generated by the engine speed sensing means so that the shift means is operable only in response to the manually generated shift control signals.

6. The control system of claim 1, further comprising:

sensing means coupled to the shift means for sensing the gear ratio status of the transmission and the position of the manual input means via the shift means, the mode switching means comprising means for preventing automatic generation of shift control signals in response to any manually induced movement of the manual input means.

7. The control system of claim 6, wherein the control unit further comprises:

means for preventing return from the manual control mode to the automatic control mode after a manually induced movement of the manual input means unless the mode selecting means is manually actuated.

8. The transmission control system of claim 1, wherein the control unit further comprises:

latch means for preventing communication of automatically generated shift control signals to the shift means unless the automatically-generated control signals are generated within a specified time interval.

9. The transmission control system of claim 8, wherein:

the control unit comprises a stored program digital computer for repetitively executing a control algorithm, a watchdog timer coupled to the computer for resetting the computer and means for placing the control system in its manual control mode if the control algorithm is not executed within a certain time interval.

10. The transmission control system of claim 1, wherein:

the shift means comprises a stepper motor having a plurality of coils which are energizable to rotate the stepper motor and power driver means for intermittently energizing selected coils in response to the automatically generated shift control signals, energization of a coil producing a fly-back signal; and the control unit comprising means for generating an error signal when no fly-back signal is produced by the selected coil and means for preventing automatic generation of further shift control signals after generation of the error signal so that thereafter, the transmission may be shifted only by application of a manually-generated control signal.

11. The vehicle transmission control system of claim 10, wherein:

the power driver means includes a pulse-width modulated power amplifier for applying a driving current to the stepper motor coil and a fly-back sensing circuit providing a current path for fly-back current produced by the coil when the power amplifier is off, means for generating the fly-back signal indicative of the absence and presence of fly-back current, and means for communicating the fly-back signal to the control unit.

12. A vehicle transmission control system comprising:

an engine-driven transmission for transmitting torque at selected gear ratios;

manual input means for manually generating shift control signals;

shift means for shifting the transmission among its gear ratios in response to manually and automatically generated shift control signals; and a control unit coupled to the shift means for automatically generating shift control signals as a function of sensed vehicle and transmission operating parameters, the control unit comprising means for establishing a variable group of gear ratios having a variable upper gear ratio corresponding to a manually selected gear ratio and having a fixed predetermined number of gear ratios, including said variable upper gear ratio, and means for preventing automatic shifting of the transmission out of said variable group of gear ratios.

13. The transmission control system of claim 12, further comprising:

an operator-actuatable mode select device movable to first and second positions; and the control unit comprising means responsive to the mode select device for selectively placing the control system in a manual control mode wherein the control system is responsive only to manually generated control signals when the mode select device is in its first position, and for placing the control system in an automatic control mode wherein the control system is responsive to both automatically and manually generated control signals when the mode select device is in its second position, the control unit also including means for setting said upper gear ratio equal to the gear ratio of the transmission prior to the placing of the control system in the automatic control mode.

* * * * *